(12) United States Patent
Frey

(10) Patent No.: US 7,612,878 B2
(45) Date of Patent: Nov. 3, 2009

(54) DEVICE FOR INSPECTING A PIPELINE

(75) Inventor: Christian W. Frey, Dornstetten (DE)

(73) Assignee: Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 46 days.

(21) Appl. No.: 11/874,686

(22) Filed: Oct. 18, 2007

(65) Prior Publication Data

US 2008/0105067 A1    May 8, 2008

(30) Foreign Application Priority Data

Nov. 8, 2006  (DE) .................. 20 2006 017 076 U

(51) Int. Cl.
*G01N 21/00* (2006.01)

(52) U.S. Cl. .................................. 356/241.1

(58) Field of Classification Search ............. 356/241.1, 356/241.5; 175/40, 41
See application file for complete search history.

(56) References Cited

U.S. PATENT DOCUMENTS

| | | | |
|---|---|---|---|
| 3,569,804 A * | 3/1971 | Studer | 318/400.41 |
| 4,453,082 A | 6/1984 | Pryor | |
| 4,901,069 A * | 2/1990 | Veneruso | 340/854.8 |
| 4,967,092 A | 10/1990 | Fraignier et al. | |
| 6,043,891 A | 3/2000 | Hartrumpf et al. | |
| 2003/0164952 A1 * | 9/2003 | Deichmann et al. | 356/603 |
| 2003/0198374 A1 | 10/2003 | Hagene et al. | |
| 2004/0114793 A1 | 6/2004 | Bondurant et al. | |

FOREIGN PATENT DOCUMENTS

| | | |
|---|---|---|
| DE | 9405098 U1 | 7/1995 |
| EP | 0351257 A1 | 1/1990 |
| EP | 0725921 | 8/1996 |
| JP | 63058135 | 3/1988 |
| JP | 04095807 | 3/1992 |
| JP | 07260439 | 10/1995 |
| WO | 9504254 | 2/1995 |

OTHER PUBLICATIONS

English Abstract of JP 63-058135. Publication Date:Mar. 12, 1988.
English Abstract of JP 07-260439. Publication Date: Oct. 13, 1995.
English Abstract of JP 04-095807. Publication Date: Mar. 27, 1992.
English Abstract of WO 9504253 also corresponds to EP 0725921. Publication Date: Aug. 14, 1996.

* cited by examiner

*Primary Examiner*—Tarifur Chowdhury
*Assistant Examiner*—Michael LaPage

(57) ABSTRACT

A device to inspect a pipeline includes an optical system for contactless detection of an interior contour of the pipeline by optical triangulation, with the optical system being attachable to a carrier structure, which is insertable in a pipeline. The optical system includes at least $n \geq 2$ triangulation sensors or light section sensors disposed rotatably about a common axis of rotation and by the n triangulation sensors or n light section sensors being disposed about the common axis of rotation spaced the greatest possible distance apart angle-wise.

11 Claims, 3 Drawing Sheets

DEVICE FOR INSPECTING A PIPELINE

This application claims priority of German Utility Model DE 20 2006 017 076.6 filed on 8 Nov. 2006, the entirety of which is incorporated by reference herein.

I. FIELD OF INVENTION

The present invention relates to a device for inspecting a pipeline, the device having an optical system for contactless detection of the contour of the interior of a pipeline by optical triangulation, with the optical system being attachable to a carrier structure, which is insertable into the pipeline.

II. BACKGROUND OF THE INVENTION

There are numerous optical systems available for examining, in particular for measuring, the geometry of pipes, canals, preferably fresh water pipes with a diameter of approximately 30 mm to about 1500 mm, all of which permit only imprecise imaging and measurement of the actual contour of the interior of the pipe.

For example, state of the art are camera systems on inherently movable platforms with a focal direction oriented in the moving direction, allowing in this manner at least purely visual examination, which gives a rough impression of the composition and geometry of the interior wall of the pipe.

Also state of the art are inspection systems which are provided with a laser light source in addition to the camera system on the inherently movable platform. The laser light source projects a visibly perceivable ring onto the interior wall of the pipe in the field of vision of the camera.

The images taken by the camera unit are stored and evaluated offline, i.e. after measurement, with the aid of special evaluation software. Ultimately, however, image evaluation again resorts to estimated dimensions. Consequently, the information value of the obtained results leaves room for improvement.

Another possible manner of inspecting the interior walls of pipes is put forth in EP 0 725 921 B1, which describes a system for three-dimensional measurement of inaccessible hollow spaces, such as preferably pipes. In this case, a tilted pivoting head is mounted on an inspection vehicle which is insertable in the respective to-be-inspected pipeline. Attached to the pivoting head are usually camera systems to vary the focal direction. Alternatively or in combination, a light section sensor is located on the tilted pivoting head in order to measure the depth of the respective pipeline. This light section sensor permits very precise measurement of the distance from the interior wall of the pipe based on trigonometric principles. Covering the entire pipe wall, however, usually requires time-consuming pivoting of the tilted pivoting head which, in addition, is provided with a very complex, motor-driven articulation.

In DE 94 05 098 A1, in order to examine hollow bodies, the light paths of two triangulation sensors, which for their part are affixed outside the to-be-examined hollow body, are introduced into the interior of the hollow body via a sensor rod and deflection mirrors attached thereto in a desired manner.

US 2004/0114793A1 describes a method for examining pipe-shaped bodies, in which method a laser diode is borne concentrically to a pipe. The laser beam of the laser diode is projected radially to the interior wall of the pipe and imaged via a field lens onto an imaging sensor.

US 2003/01 98 374 A1 describes a device for examining pipelines, which device can be moved through the interior of a pipeline by means of an inherently movable platform. The platform is provided with light sources whose light reflected at the interior wall of the pipeline is detected by light sensors. The optical elements are accommodated in a gas-tight housing in which the optical elements are borne in a vibration-dampened manner via affixing elements.

III. SUMMARY OF INVENTION

The object of the present invention is to further improve a device for inspection of a pipeline, the device having an optical system for contactless detection of the contour of the interior of a pipeline by means of optical triangulation, with the optical system being attachable to a carrier structure, which is insertable into the pipeline, in such a manner that measurement of the interior contour of the pipeline can be carried out quicker and more precisely than is possible with hitherto state-of-the-art methods. Furthermore, the object is to construct the device as compactly, lightly and inexpensively as possible.

According to the invented solution, a device for inspecting a pipeline is designed in such a manner that the optical system provides at least $n \geq 2$ triangulation sensors or light section sensors disposed in such a manner that they are rotatable about a common axis of rotation. The n triangulation sensors or light sensors are arranged about the common axis of rotation in such a manner that they are the greatest possible distance apart angle-wise.

The idea on which the present invention is based is simultaneous coverage of the interior pipe wall with the aid of at least two triangulation sensors or light section sensors which are disposed rotatably on a carrier structure designed as an inherently movable platform, each emitting a laser beam, respectively, oriented approximately perpendicular to the axis of rotation in the direction of the interior contour of the pipeline. The laser beams allocatable to the individual triangulation sensors or light section sensors are preferably oriented in a plane which is also approximately perpendicular to the axis of rotation, with the axis of rotation being directed concentrically as possible to the longitudinal axis of the pipeline by the inherently movable platform.

Turning the rotatably disposed triangulation sensors or light section sensors and simultaneously moving the entire device forward by means of the platform, which is movable along the pipeline, permits geometrically scanning and simultaneously measuring the interior surface of the pipe geometrically. By employing at least two triangulation sensors or light section sensors, at least two spots are measured simultaneously thereby rendering geometric determination insensitive, in particular, to time-based off-centeredness, tilting and wobbling of the measuring system. In particular, tilting in the direction of the longitudinal axis of the pipe and other deviations, especially due to wobbling, can be detected with the aid of at least two measuring points preferably lying diametrically opposite each other relative to the axis of rotation.

It is, of course, possible that more than two triangulation sensors or light section sensors may be borne rotatably about the axis of rotation, the sensors being disposed relative to each other in such a manner that the light spots of the respective triangulation sensors or light section sensors impinging on the interior wall of the pipe are circularly the greatest possible distance apart. In an arrangement of n triangulation sensors or light sensors, the angle between the individual light beams is 360°/n. For further more detailed elucidation of the device according to the solution to the object of the present invention for inspecting a pipeline see the following preferred embodiments with reference to the figures.

As used herein "substantially", "generally", "relatively", "approximately", and "about" are relative modifiers intended to indicate permissible variation from the characteristic so modified. It is not intended to be limited to the absolute value or characteristic which it modifies but rather approaching or approximating such a physical or functional characteristic.

References to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

IV. BRIEF DESCRIPTION OF DRAWINGS

The present invention is made more apparent by way of example in the following using preferred embodiments with reference to the drawing without the intention of limiting the scope or spirit of the overall inventive idea.

Figure 3A:
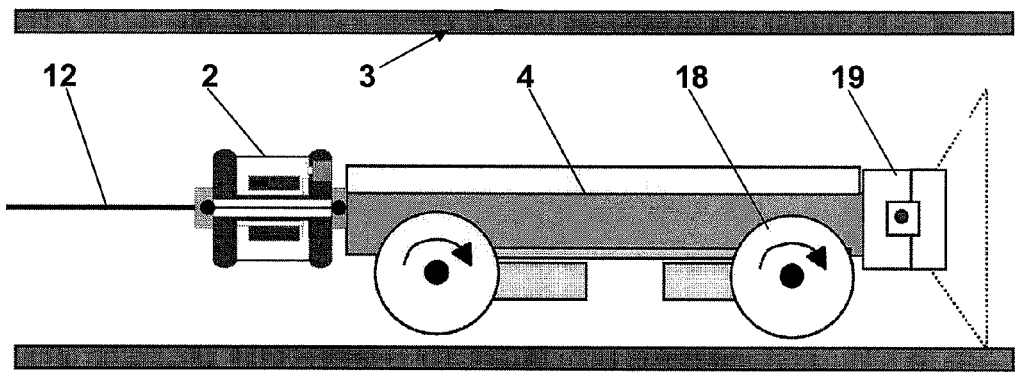

FIGS. 3a,b,c show an inherently movable platform with the device for examining a pipeline placed thereon and with a camera head as well as other variations.

V. DETAILED DESCRIPTION OF INVENTION

Figure 1:
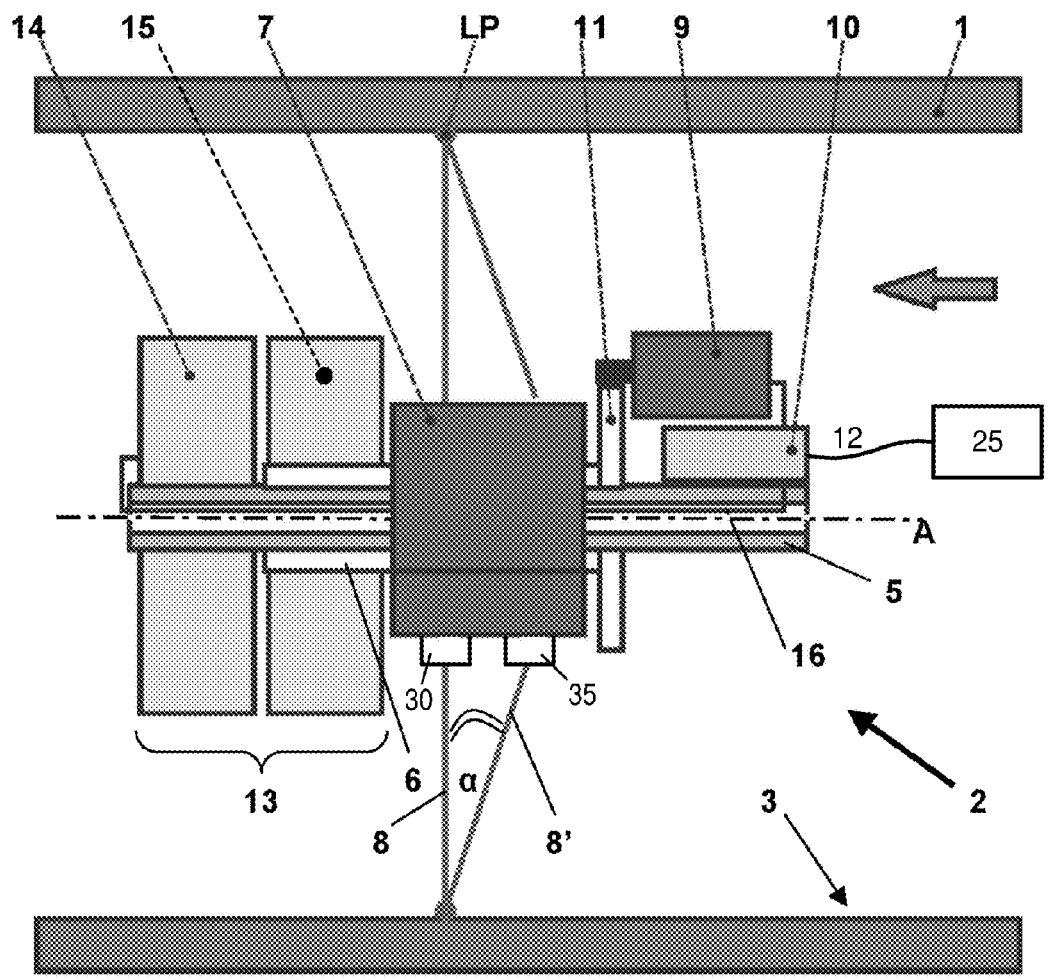
FIG. 1 shows a longitudinal section of a device inserted in a pipeline to inspect the same.

FIG. 1 shows a schematic longitudinal section of a pipeline 1 along the pipe axis A of which is provided a system 2 for inspecting the interior wall 3 of the pipe designed according to the invented solution. The system 2 according to the invented solution depicted in FIG. 1 is attachable to an inherently movable platform 4 for alignment along the pipe axis A and especially for moving inside the pipe 1, as is described in particular with reference to FIG. 3.

A system according to the invented solution is provided with a stationary part 5 which is connected, for example, to the inherently movable platform 4 depicted in FIG. 3. Provided in longitudinal direction to the stationary part 5 is a rotatable part 6 which is connected to a drive disk 11 which engages with a rotary drive 9. The rotatable part 6 and the drive disk 11 represent a platform for a triangulation sensor system or light section sensor system 7 which is rotatably borne about the axis of rotation A.

In the shown embodiment, four laser triangulation sensors are placed on the rotatably designed platform. The laser beams 8 of the laser triangulation sensors are oriented perpendicular to the longitudinal axis of the pipe, which at the same time is the axis of rotation about which the rotatable platform rotates. The individual laser beams 8 of the light section sensors lie diametrically opposite in relation to the axis of rotation A, respectively pipe axis A, each generating a light spot LP, respectively, on the opposite regions of the interior wall of the pipe. In order to detect the light spots LP projected on the interior wall of the pipe and in order to determine their spatial position, the light spots LP are detected at an angle α to the laser beam direction by at least one receiver in longitudinal direction to the receiving direction 8'. The at least two triangulation sensors or light section sensors are each allocatable to an optical axis along which the laser light source emits light and which forms an angle α unequal to 0° with a viewing direction which is allocatable to the receiver. The at least two triangulation sensors or light section sensors are disposed such that the optical axes of the at least two triangulation sensors or light section sensors lie in a common plane which is oriented perpendicular to the axis of rotation. In embodiments, the laser triangulation sensors or light section sensors have at least one laser light source 30 and at least one receiver 35. The at least one receiver may be a CCD matrix camera, a linear sensor, or a position sensitive device (PSD).

An electric motor 9, which is activated by an activating electronics 10 and which is connected to the stationary part 5, serves as the rotary drive. The motoric rotary drive 9 engages in an active connection with the drive disk 11 connected to the rotatable part 6, for example via a serration toothing contour lying radially on the outside of the drive disk 11. The activation electronics 10 is connected via a cable 12 to an external control console 25, from which the system according to the invented solution obtains all the control signals, respectively the electric energy required for operation.

A transmission unit 13 composed of two components is provided for transmission of the control signals and the electric energy between the stationary part 5 and the rotatably borne triangulation sensors or light section sensors. The transmission unit 13 ensures contactless energy transmission and signal transmission between the stationary part and the rotatable part.

The transmission unit 13 is provided with two coil elements 14, 15 which stand axially opposite each other in longitudinal direction of the axis of rotation, of which in the representation according to FIG. 1 the left coil element 14 is connected to the stationary part 5 and the right coil element 15 is connected to the rotatable part 6. Signal transmission and the energy transmission occur purely inductively. Between the two coil elements 14 and 15 is a narrow gap. Inside the stationary part 5, which is designed as a hollow shaft, runs a connecting line 16 between the activation electronics 10 and the stationary coil element 14 for energy transmission and signal transmission. The signal flow between the two coil elements 14, 15 which stand axially opposite each other occurs, of course, bidirectionally so that the sensor signals present on the triangulation sensor side or on the light section sensor side, too, can externally reach outside a control and evaluation console 25 via the transmission unit 13, the connecting line 16, the activation electronics 10 and the cable 12 for further processing and evaluation.

Simultaneous and highly precise measurement of the contour of the interior wall of the pipe at least two points permits substantially improving the robustness of the measuring process against time-based mechanical movements of the system according to the invented solution inside the pipeline by relatively small simple construction measures and thus with little cost. It is assumed that for complete measurement of the pipe the entire measurement system is moved through the pipe in the spatial direction according to FIG. 1 as depicted by the arrow direction.

Figure 2:
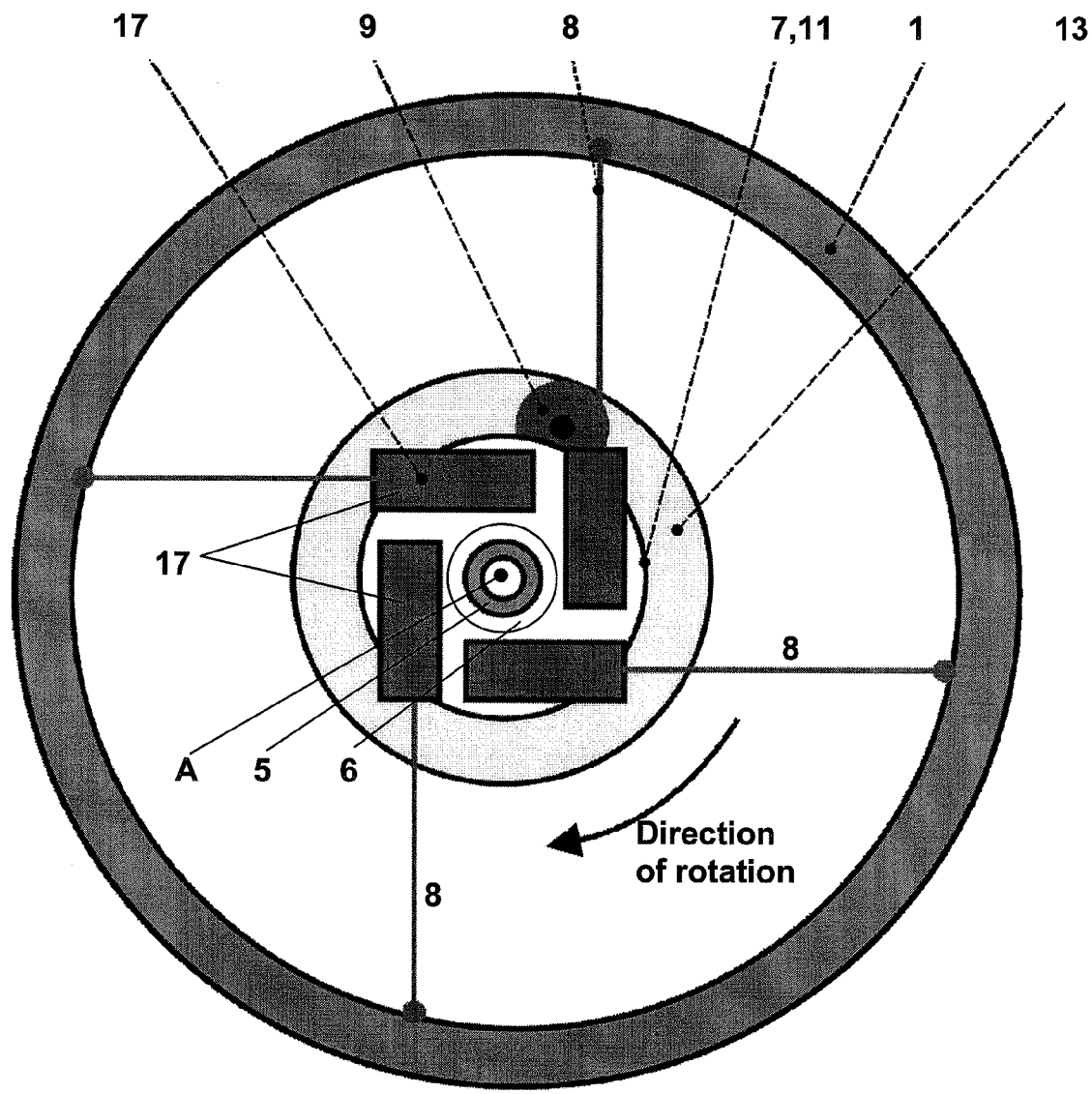
FIG. 2 shows a cross section of a device depicted in FIG. 1.

FIG. 2 shows a cross section of the pipeline 1 as well as a combined cross section representation with an axial-direction-oriented view of the system according to the invented solution. Provided on the platform rotatably borne about the axis of rotation A are four laser triangulation sensors 17 whose light beams 8 each are oriented perpendicular to the axis of rotation A and are spaced the greatest possible distance apart angle-wise. As the number of laser triangulation sensors 17 is n=4, the light beams 8 each have an angle of 360/4=90°. Moreover, shown is the motor 9 which peripherally engages with the drive disk 11. Behind it the rotatable part of the transmission unit 13 can be recognized. The activation electronics 10 is omitted for better clarity.

The optical system for inspecting a pipeline shown in FIGS. 1 and 2 is designed as an autonomously operating sensor head and can be mounted on an inherently movable platform preferably for autonomous navigation inside the pipeline, as for example shown in the schematic representation in FIG. 3a. The inherently movable platform 4 is designed as a robot-like vehicle and is provided with driven wheels 18. The system 2 according to the invented solution with which exact inspection of the interior wall of the pipe is possible is attached toward the rear of the vehicle 4. The system according to the invented solution is connected via the cable 12 to an external control and evaluation unit 25. A camera unit 19 with which optical examination, respectively monitoring of the to-be-inspected pipeline may be provided on the vehicle 4 in the moving direction. The image data obtained by camera unit 19 can be combined with the measured signals obtained by the triangulation sensors or light section sensors in the subsequent evaluation in such a manner that the information content of the measured data can be supplemented with visual information. For example, the sensors can determine that there are indentations on the interior wall of the pipe or there are rough areas on the surface. By the video images, which are combined with the measured data, for example it can be determined, in addition, that the indentations or the rough areas detected as part of the measurement are caused by rust formation indicated by the red color so characteristic of rust in the video image data.

Figure 3B:
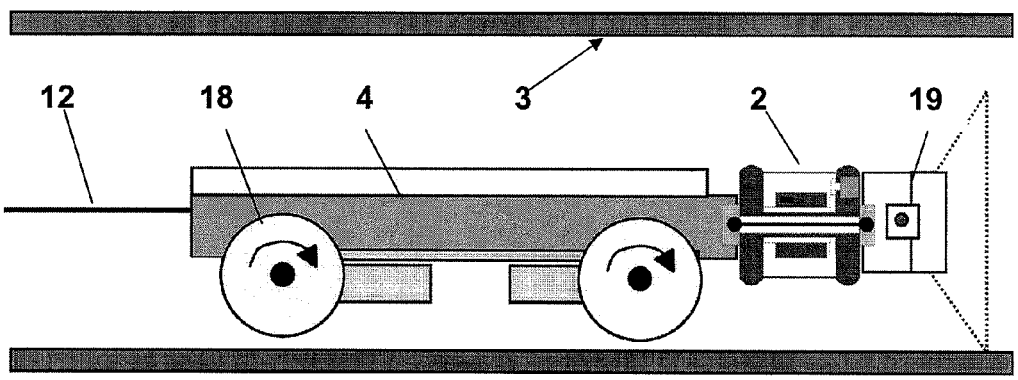

Of course, any other combinations and respective systems of the sensor head are feasible according to the invented solution on vehicle 4, such as, as shown in FIG. 3b in which the sensor head 2 with the camera unit 19 is attached at the front in the moving direction.

Figure 3C:
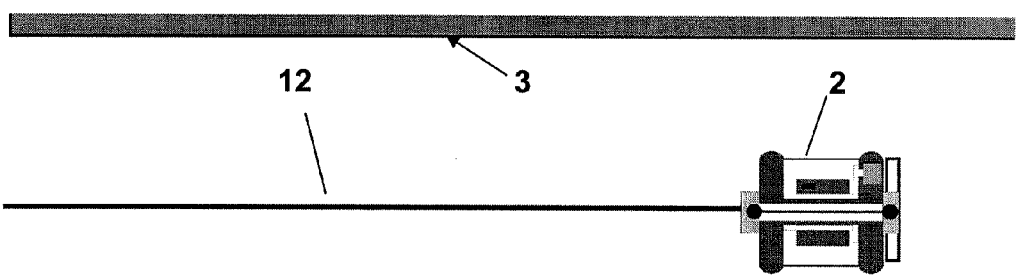

Also feasible is a sensor head system 2 according to the invented solution, which is articulated to a correspondingly robustly designed cable guide 12 according to the embodiment in FIG. 3c. Positioning of the sensor head occurs by corresponding manipulation at the end of the cable. In this embodiment, the sensor head 2 can also be combined with a camera unit.

With the aid of the system according to the invented solution, all types of pipes and pipelines, especially sewage pipes and fresh water pipelines can be measured, in particular, in order to detect damage, control repair measures and determine the interior geometry as well as to determine the hydraulic performance of the pipelines.

Also feasible is intelligent bearing of the sensor head on the vehicle 6 in such a manner that if tilting or off-centeredness of the sensor head relative to the longitudinal axis of the pipe is detected, the sensor head always remains aligned centered to the longitudinal axis of the pipe via suited adjustment kinematics.

Although specific embodiments of the invention have been described herein, it is understood by those skilled in the art that many other modifications and embodiments of the invention will come to mind to which the invention pertains, having benefit of the teaching presented in the foregoing description and associated drawings.

It is therefore understood that the invention is not limited to the specific embodiments disclosed herein, and that many modifications and other embodiments of the invention are intended to be included within the scope of the invention. Moreover, although specific terms are employed herein, they are used only in generic and descriptive sense, and not for the purposes of limiting the description invention.

LIST OF REFERENCES 1 pipe
2 system according to the invented solution, sensor head
3 interior wall of the pipe
4 inherently movable platform, vehicle
5 stationary part
6 rotatable part
7 laser triangulation sensor system
8 light beam, laser beam
8' reception direction
9 drive unit, motor
10 activation electronics
11 drive disk
12 cable
13 transmission unit
14, 15 coil element
16 connecting cable
17 light section sensor, laser triangulation sensor
18 wheels
19 camera unit
25 external control console
30 light source
35 receiver

What is claimed is:

1. A device to inspect a pipeline, comprising:
an optical system for contactless detection of an interior contour of a pipeline by optical triangulation, with the optical system being attachable to a carrier structure, which is insertable in the pipeline,
wherein the optical system comprises at least two triangulation sensors or light section sensors disposed rotatably about a common axis of rotation, and
wherein the at least two triangulation sensors or light section sensors are disposed about the common axis of rotation spaced the greatest possible distance apart angle-wise,
wherein the optical system is designed as a rotatable sensor head which is attached to the carrier structure and comprises:
a stationary part which is connected to the carrier structure and which is articulated to a motor-driven, rotatable part to which the at least two triangulation sensors or light section sensors are attached,
a rotary drive unit which is directly or indirectly connected to the stationary part and which supplies signals and energy to an external unit via a cable, and
a transmission unit which is connected at least partly to the stationary part and ensures contactless signal exchange between and to the triangulation sensors or light sensors attached to the rotatable part as well as contactless supplying of energy to the triangulation or light sensors.

2. The device according to claim 1, wherein the at least two triangulation sensors or light section sensors are each designed as laser triangulation sensors or light section sensors having at least one receiver and at least one laser light source.

3. The device according to claim 2, wherein the at least one receiver is a CCD matrix camera, a linear sensor, or a position sensitive device (PSD).

4. The device according to claim 2, wherein the at least two triangulation sensors or light section sensors are each allocatable to an optical axis along which the laser light source emits light which forms an angle $\alpha$ unequal 0° with a viewing direction which is allocatable to the receiver.

5. The device according to claim 4, wherein the at least two triangulation sensors or light section sensors are disposed such that the optical axes of the at least two triangulation sensors or light section sensors lie in a common plane which is oriented perpendicular to the axis of rotation.

6. The device according to claim 1, wherein the transmission unit comprises two coil elements borne rotatably relative to each other between which at least one of the energy exchange or signal exchange occurs inductively, and
wherein one coil element is connected directly to the rotatable part and the other coil element is connected to the stationary part, and
wherein the two coil elements are spaced axially apart in longitudinal direction to the axis of rotation by an air gap.

7. The device according to claim 1, wherein the triangulation sensor comprises a line triangulation sensor.

8. The device according to claim 1, further comprising a camera unit attached to the carrier structure for visual coverage of an interior wall of the pipe.

9. A device according to claim 1, further comprising drive wheels.

10. A device to inspect a pipeline, comprising:

a stationary part connected with a rotary drive;

a rotatable part positioned in a longitudinal direction to the stationary part and which engages the rotary drive, wherein the rotatable part serves as a platform for at least two triangulation laser sensors or light section sensors, wherein beams of said at least two laser triangulation sensors or light section sensors are oriented perpendicular to an axis of rotation about which the rotatable platform rotates; and a transmission unit comprising two coil elements, one coil element being connected to the stationary part, and the other coil element being connected to the rotatable part, wherein the transmission unit ensures contactless energy transmission and signal transmission between the stationary part and the rotatable part.

11. A device according to claim 10, wherein for n laser triangulation sensors or light section sensors, an angle between individual beams is 360°/n.

* * * * *